(12) United States Patent
Hall et al.

(10) Patent No.: US 9,364,903 B2
(45) Date of Patent: Jun. 14, 2016

(54) DRILLING APPARATUS AND METHOD

(71) Applicant: Irwin Industrial Tool Company, Huntersville, NC (US)

(72) Inventors: Ryan Hall, Charlotte, NC (US); Rainer Eggers, Steinkirchen (DE); Kim Franklin, Statesville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 293 days.

(21) Appl. No.: 14/051,914

(22) Filed: Oct. 11, 2013

(65) Prior Publication Data

US 2015/0101177 A1    Apr. 16, 2015

(51) Int. Cl.
*B23B 51/08* (2006.01)
*B25B 21/00* (2006.01)

(52) U.S. Cl.
CPC ............... *B23B 51/08* (2013.01); *B25B 21/007* (2013.01); *B23B 2260/0482* (2013.01); *Y10T 29/49963* (2015.01); *Y10T 408/566* (2015.01)

(58) Field of Classification Search
CPC   B23B 51/08; B25B 21/007; Y10T 29/49963; Y10T 408/566
See application file for complete search history.

(56) References Cited

U.S. PATENT DOCUMENTS

| | | | | |
|---|---|---|---|---|
| 3,336,611 A | * | 8/1967 | Schepp | B25B 21/007 408/202 |
| 3,932,904 A | * | 1/1976 | Nilsson | B25B 21/007 279/145 |
| 3,965,510 A | * | 6/1976 | Ernst | B25B 21/007 7/158 |
| 4,218,794 A | * | 8/1980 | Seidel | B25F 3/00 30/158 |
| 4,218,795 A | * | 8/1980 | Ernst | B25F 3/00 7/158 |
| 4,551,875 A | * | 11/1985 | Getz | B25B 21/007 7/138 |
| 4,573,839 A | * | 3/1986 | Finnegan | B23B 31/113 279/14 |
| 4,676,703 A | * | 6/1987 | Swanson | B25B 21/007 279/14 |
| 4,791,690 A | * | 12/1988 | Kuang-Wu | B25F 3/00 7/138 |
| 4,796,319 A | * | 1/1989 | Taft | B25B 21/007 408/225 |
| 4,929,127 A | | 5/1990 | Fischer | |
| 4,964,475 A | | 10/1990 | Fischer | |

(Continued)

FOREIGN PATENT DOCUMENTS

DE   2746029 C2   10/1985
EP   1452256 A1   9/2004

*Primary Examiner* — David B Thomas
(74) *Attorney, Agent, or Firm* — Sutherland Asbill & Brennan LLP

(57) ABSTRACT

A drill bit has a shank adapted to be attached to a power tool and a cutting portion adapted to drill a hole in a material. A collar is spaced along the length of the drill bit to set a depth distance that the drill bit is allowed to be inserted into a material being drilled. The drill bit further comprises a first engagement structure. A sleeve comprises a second engagement structure that is releasably engageable with the first engagement structure. The sleeve further comprises a coupling mechanism for connecting the sleeve to a fastener driver.

19 Claims, 14 Drawing Sheets

(56) References Cited

U.S. PATENT DOCUMENTS

| | | | | |
|---|---|---|---|---|
| 5,038,435 | A * | 8/1991 | Crawford | B25F 1/02 279/93 |
| 5,222,848 | A * | 6/1993 | Kuang-Wu | B23B 45/003 279/905 |
| 5,313,680 | A | 5/1994 | Ringler | |
| 5,382,120 | A * | 1/1995 | Parsons | B23B 49/00 33/201 |
| 5,409,333 | A * | 4/1995 | Hu | B25B 21/007 279/14 |
| 5,454,245 | A * | 10/1995 | Markisello | E05B 19/20 29/426.4 |
| 5,470,180 | A * | 11/1995 | Jore | B23B 31/1071 279/14 |
| 5,586,847 | A * | 12/1996 | Mattern, Jr. | B23B 51/108 279/145 |
| 5,624,214 | A * | 4/1997 | Carroll | B23Q 1/703 279/105.1 |
| 5,651,647 | A * | 7/1997 | Ray | B23B 31/1207 279/14 |
| 5,779,404 | A * | 7/1998 | Jore | B23B 31/1071 279/14 |
| 5,785,468 | A * | 7/1998 | Peritz | B23B 51/108 279/79 |
| 5,943,925 | A * | 8/1999 | Huang | B25G 1/007 81/177.1 |
| 5,975,815 | A * | 11/1999 | Zierpka | B25B 21/007 279/22 |
| 6,176,654 | B1 * | 1/2001 | Jore | B23B 31/1071 279/14 |
| 6,223,375 | B1 | 5/2001 | Vaughan, Jr. | |
| 6,347,914 | B1 * | 2/2002 | Boyle | B23B 31/1074 408/226 |
| 6,488,452 | B1 * | 12/2002 | Hoskins | B23B 31/1071 279/14 |
| 6,726,411 | B2 * | 4/2004 | Sommerfeld | B23B 47/287 408/1 R |
| 6,761,361 | B2 * | 7/2004 | Taylor | B25B 23/0035 279/14 |
| 7,086,813 | B1 * | 8/2006 | Boyle | B23B 31/1074 279/145 |
| 7,127,972 | B2 * | 10/2006 | Klein | B23B 51/126 81/177.2 |
| 7,147,409 | B2 * | 12/2006 | Wienhold | B23B 49/005 408/1 R |
| 7,334,970 | B2 * | 2/2008 | Kozak | B23B 31/005 279/137 |
| 7,354,230 | B2 * | 4/2008 | Bauman | B23B 31/008 279/143 |
| 7,491,203 | B2 * | 2/2009 | Harris, Jr. | A61B 17/1617 606/80 |
| 7,771,143 | B2 * | 8/2010 | Bharadwaj | A61B 17/1633 408/1 R |
| 8,052,359 | B2 * | 11/2011 | Wirth, Jr. | B23B 49/005 408/191 |
| 8,057,136 | B2 * | 11/2011 | Chiang | B23B 45/003 279/14 |
| 8,061,000 | B2 * | 11/2011 | Santamarina | B25B 31/00 173/128 |
| 8,132,990 | B2 * | 3/2012 | Bauman | B23B 31/008 279/137 |
| 8,602,285 | B2 * | 12/2013 | Santamarina | B23B 51/08 173/128 |
| 8,876,444 | B1 * | 11/2014 | Chanturidze | B23B 49/005 408/191 |
| 2007/0074350 | A1 * | 4/2007 | Dreps | B23B 51/08 7/158 |
| 2008/0056836 | A1 * | 3/2008 | Shiao | B23B 31/005 408/191 |
| 2010/0303578 | A1 * | 12/2010 | Armiento | B23B 51/08 411/57.1 |
| 2011/0038678 | A1 | 2/2011 | Cousineau | |
| 2014/0183827 | A1 * | 7/2014 | Keightley | B23B 31/005 279/30 |

* cited by examiner

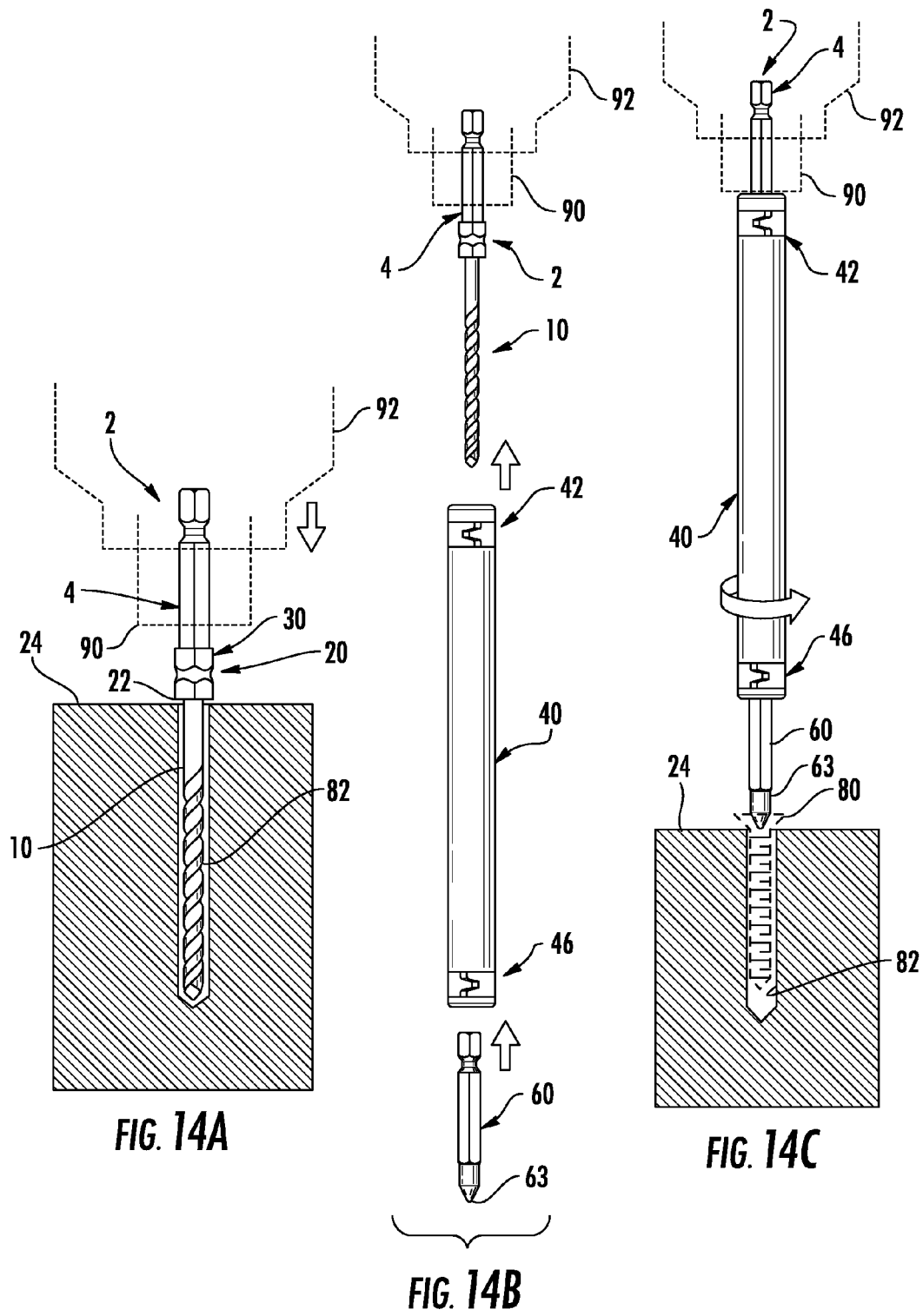

DRILLING APPARATUS AND METHOD

BACKGROUND OF THE INVENTION

The invention relates to drilling systems and more particularly to methods and apparatuses for installing fasteners using a pilot hole. In some circumstances in order to properly install a fastener such as a screw a pilot hole is drilled using a drill bit to an appropriate depth and diameter as specified for the fastener being installed. The fastener is then driven into the predrilled hole. The drilling of the hole and the driving of the fastener may be accomplished using a power tool such as a rotary drill or impact rotary drill.

SUMMARY OF THE INVENTION

In some embodiments, a drilling apparatus comprises a drill bit comprising a shank adapted to be attached to a power tool and a cutting portion adapted to drill a hole in a material. A collar is spaced along the length of the drill bit. The drill bit further comprises a first engagement structure. A sleeve comprises a second engagement structure that is releasably engageable with the first engagement structure. The sleeve further comprises a coupling mechanism for connecting the sleeve to a fastener driver.

The first engagement structure may be formed on the collar. The first engagement structure may comprise a peripheral surface formed with at least one flat face. The second engagement structure may comprise a socket. The sleeve may comprise a hollow member dimensioned to receive the drill bit. The coupling mechanism may comprise a socket. The coupling mechanism may comprise a head. The drill bit may be insertable through the second engagement member into the sleeve. The sleeve may comprise an internal chamber where the internal chamber may be accessed through an aperture such that the drill bit may be inserted through the aperture into the chamber with the first engagement structure engaging the second engagement structure. The shank may comprise a quick connect shank. The cutting portion may comprise a masonry drill. The collar may be fixed in position on the drill bit to set the depth distance that the drill bit penetrates into a material being drilled. The collar may be movable along the length of the drill bit to vary the depth distance. The collar may comprise a countersink head.

In some embodiments a drill bit comprises a shank adapted to be attached to a power tool and a cutting portion adapted to drill a hole in a material. A collar is spaced along the length of the drill bit comprising a first engagement structure adapted to be attached to a sleeve.

The first engagement structure may comprise a peripheral surface of the collar formed with at least one flat face. The shank may comprise a quick connect shank. The collar may be fixed in position on the drill bit to set a depth distance that determines a distance the drill bit penetrates into a material being drilled In some embodiments, a method of installing a fastener comprises attaching a drill bit to a power tool, the drill bit comprising a shank, a cutting portion adapted to drill a hole in a material and a collar permanently secured to the drill bit in a position along the length of the drill bit; drilling a hole using the cutting portion to penetrate the material; removing the drill bit from the hole; securing a driver sleeve to the drill bit, the driver sleeve supporting a fastener driver; and screwing a fastener into the hole using the fastener driver.

To set a depth distance that the drill bit is allowed to be inserted into a material being drilled a stop is provided along the length of the bit. The method may comprise attaching the fastener driver to the driver sleeve using a coupling mechanism. The step of securing the drive sleeve to the bit may comprise inserting the bit into the driver sleeve. The step of securing a driver sleeve to the drill bit may comprise engaging a first engagement structure on the drill bit with a mating second engagement structure on the sleeve. Engaging a first engagement structure on the drill bit with a mating second engagement structure on the driver sleeve may comprise inserting one of the first engagement structure and the second engagement structure into a socket.

BRIEF DESCRIPTION OF THE DRAWINGS

FIGS. 14A-14C illustrate an embodiment of a method of using the drilling system of the invention.

DETAILED DESCRIPTION OF PREFERRED EMBODIMENTS OF THE INVENTION

Figure 1:
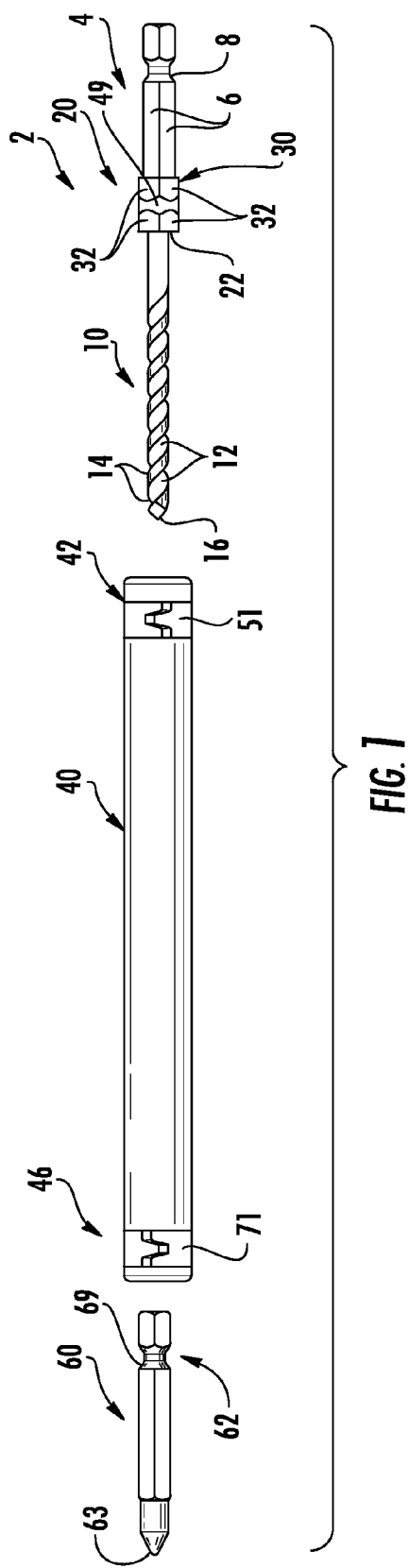
FIG. 1 is a plan view showing an embodiment of the drill bit and drilling system of the invention disassembled.
Figure 2:
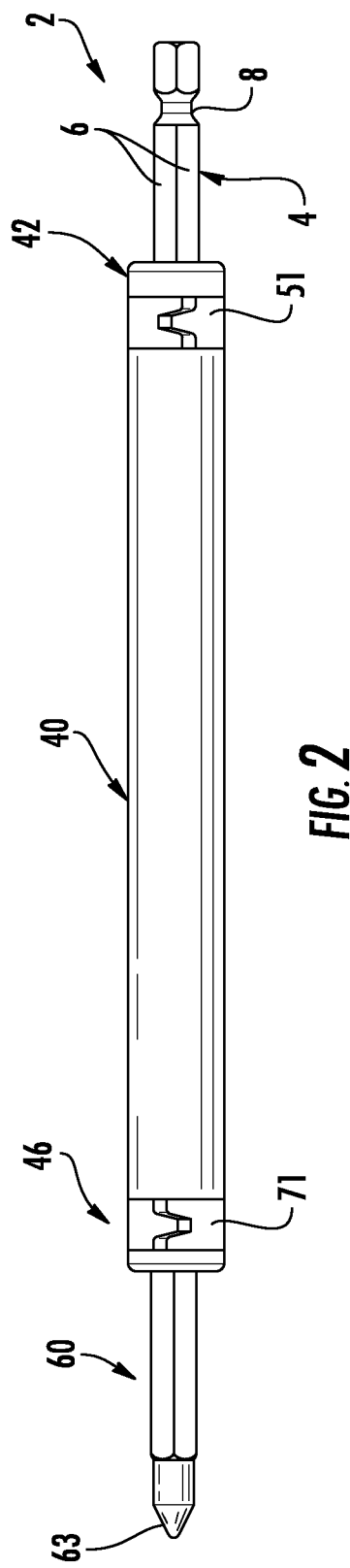
FIG. 2 is a plan view of the embodiment of FIG. 1 assembled.
Figure 3:
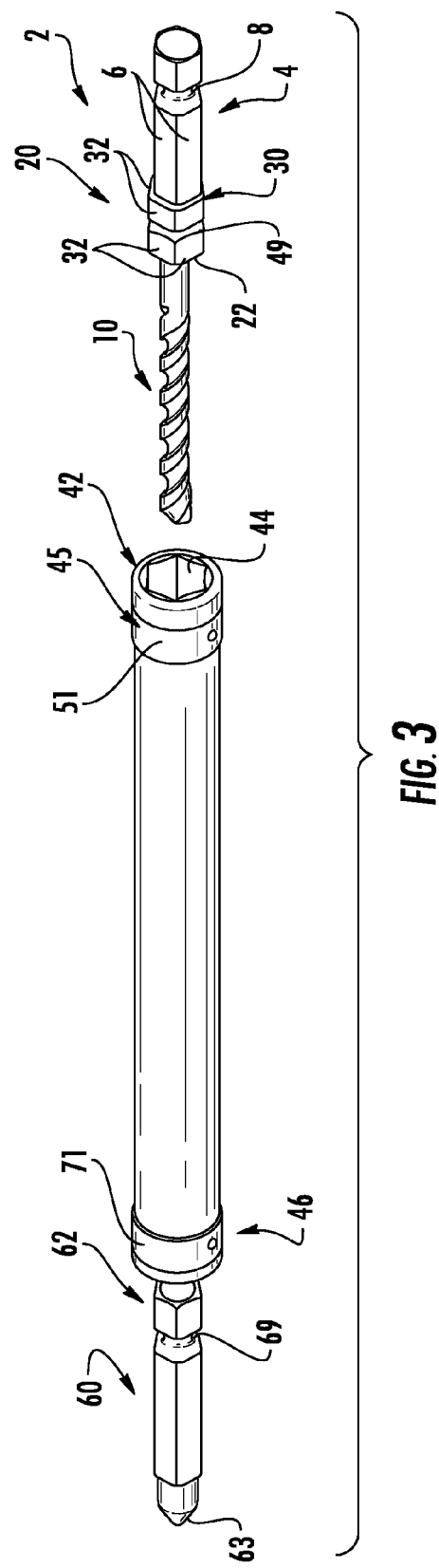
FIG. 3 is a perspective view of the embodiment of FIG. 1 disassembled.
Figure 4:
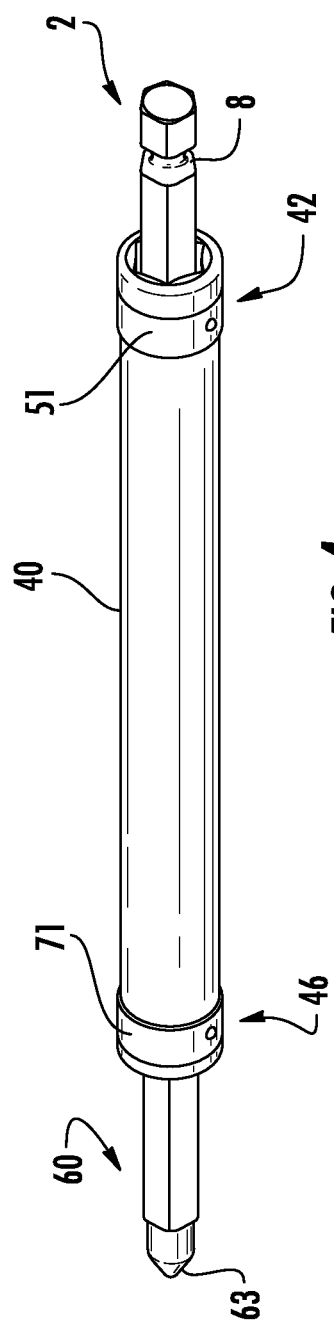
FIG. 4 is a perspective view of the embodiment of FIG. 1 assembled.
Figure 5:
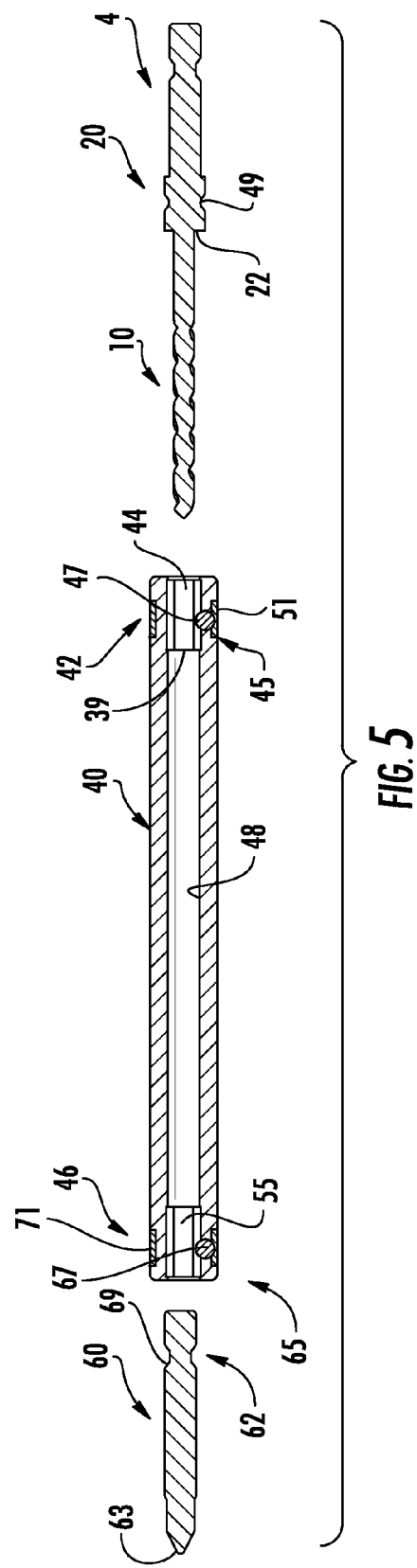
FIG. 5 is a section view of the embodiment of FIG. 1 disassembled.
Figure 6:
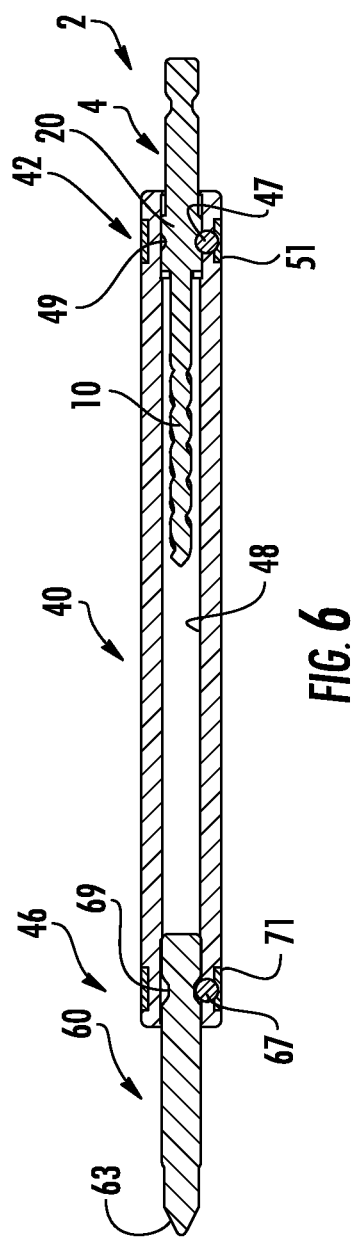
FIG. 6 is a section view of the embodiment of FIG. 1 assembled.
Figure 7:
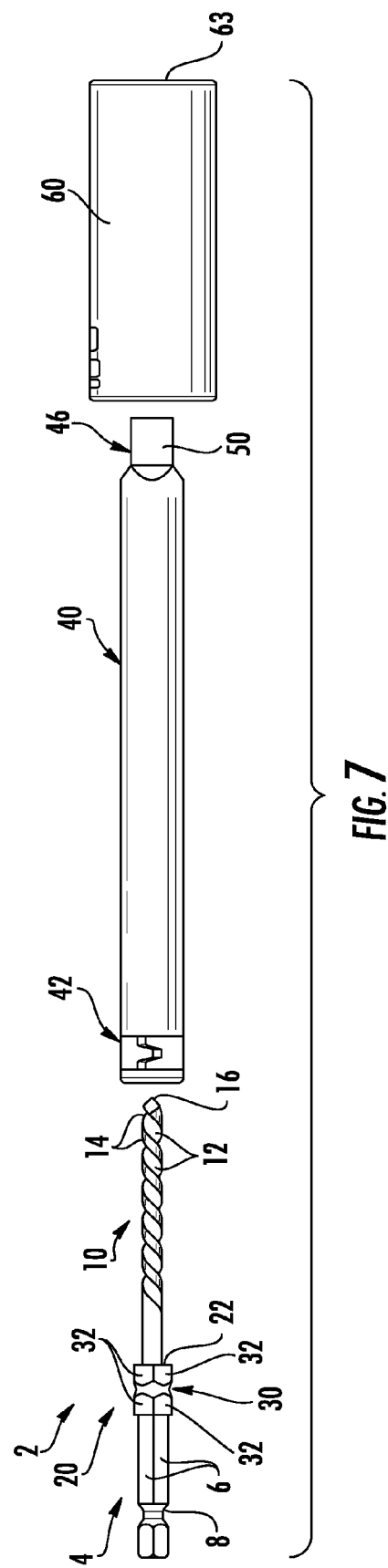
FIG. 7 is a plan view of another embodiment of the drill bit and drilling system of the invention disassembled.
Figure 8:
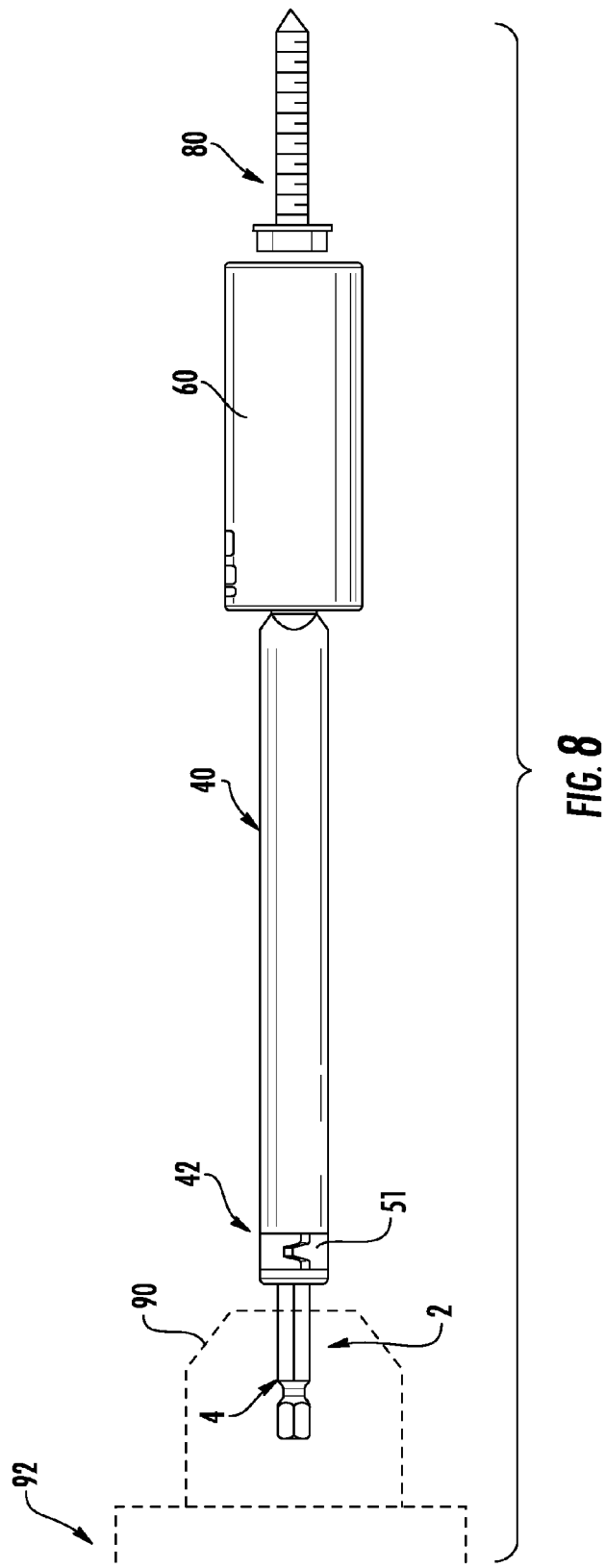
FIG. 8 is a plan view of the embodiment of FIG. 7 assembled.
Figure 9:
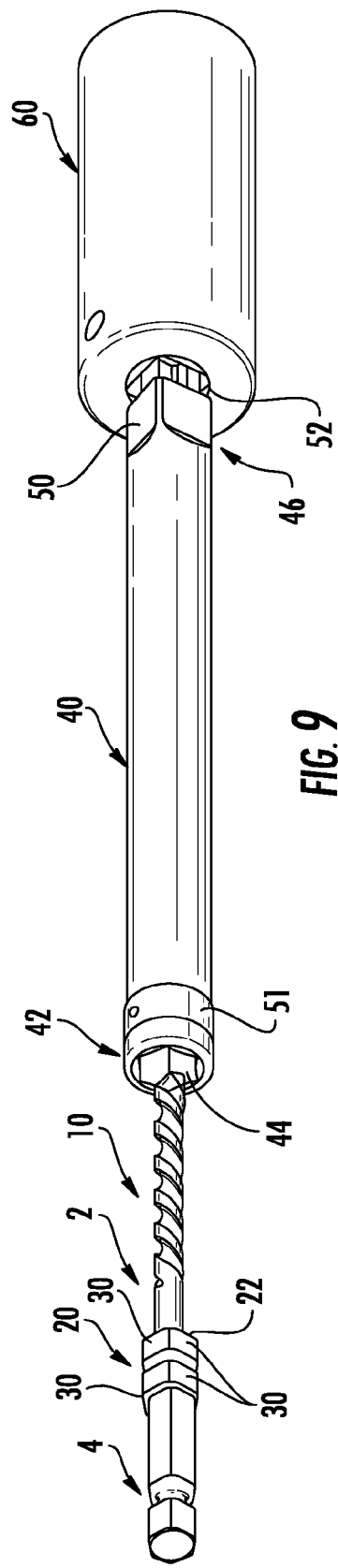
FIG. 9 is a perspective view of the embodiment of FIG. 7 disassembled.
Figure 10:
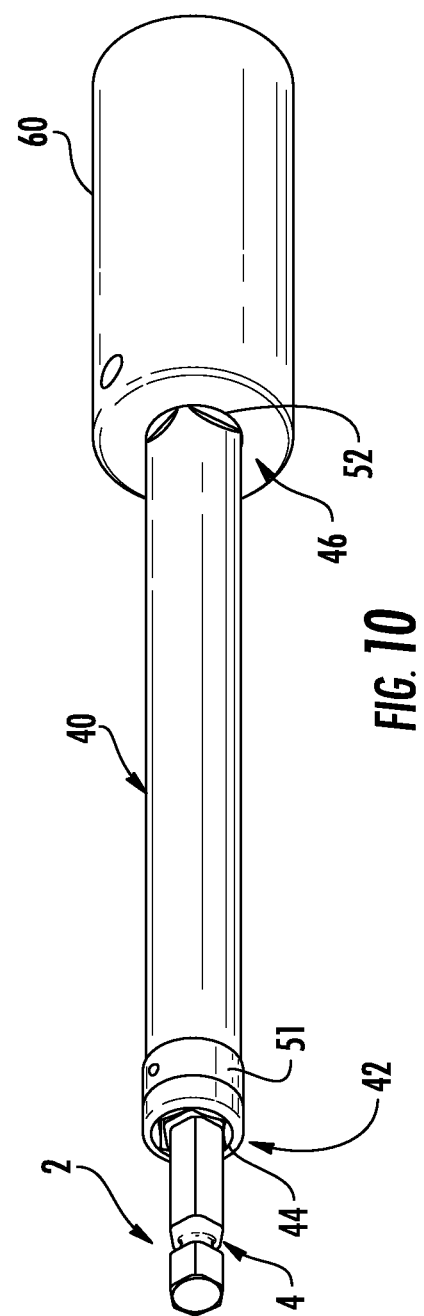
FIG. 10 is a perspective view of the embodiment of FIG. 7 assembled.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element to another element as illustrated in the figures. It will be understood that these terms are intended to set forth the orientation of different components of the device in relationship to one another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, steps, operations, elements, and/or components, but do not preclude the presence or addition of one or more other features, steps, operations, elements, components, and/or groups thereof.

In some embodiments, an apparatus and method for installing screws using a pilot hole is described herein. In some embodiments the apparatus and system may be used to install screws such as masonry screws in masonry, concrete or similar materials. In other embodiments the apparatus and system may be used to install other types of fasteners in other types of materials such as wood or metal. To properly install a fastener such as a screw in, for example, such as in masonry or concrete, a pilot hole is drilled using a drill bit to an appropriate depth and diameter as specified for the fastener being installed. The fastener is then driven into the predrilled hole. If the depth of the pilot hole is too shallow, the user typically doesn't recognize the problem until the fastener is installed and the lead end of the fastener bottoms out on the pilot hole before the head of the fastener is flush with the surface. In this situation the installer must remove the fastener from the hole, remove the fastener driver from the power tool, reinstall the drill bit in the power tool, increase the depth of the pilot hole, remove the drill bit from the power tool, reinstall the fastener driver in the power tool and re-drive the fastener into the hole. If too deep a pilot hole is drilled, the fastener may be installed but the drilling of the hole wastes time and causes excessive wear on the bit. In applications where a pilot hole may not always be required and/or where the depth of the hole is not always critical, such as in the driving of wood screws into wood, it may be desirable to drill a pilot hole in some circumstances such as to prevent splintering of the wood or to create a countersink hole. In these applications, the user still must change between the drilling tool and the fastener driver for each fastener. These issues are exacerbated in high volume applications typical for professional tradesmen.

The pilot holes may be drilled using either round shank drill bits that fit standard corded and cordless power drills or quick connect shanks that connect to a quick connect coupling on the power tool. In masonry applications the power tools may comprise SDS or TEC style rotary power drills that use quick connect shanks. One typical quick connect shank comprises a ¼ inch quick change shank that may be used with a ¼ inch quick change chuck. Standard power drills may accept both the quick change shanks and the standard round shanks. Embodiments of the invention may be used with one or both types of chucks.

Figure 11:
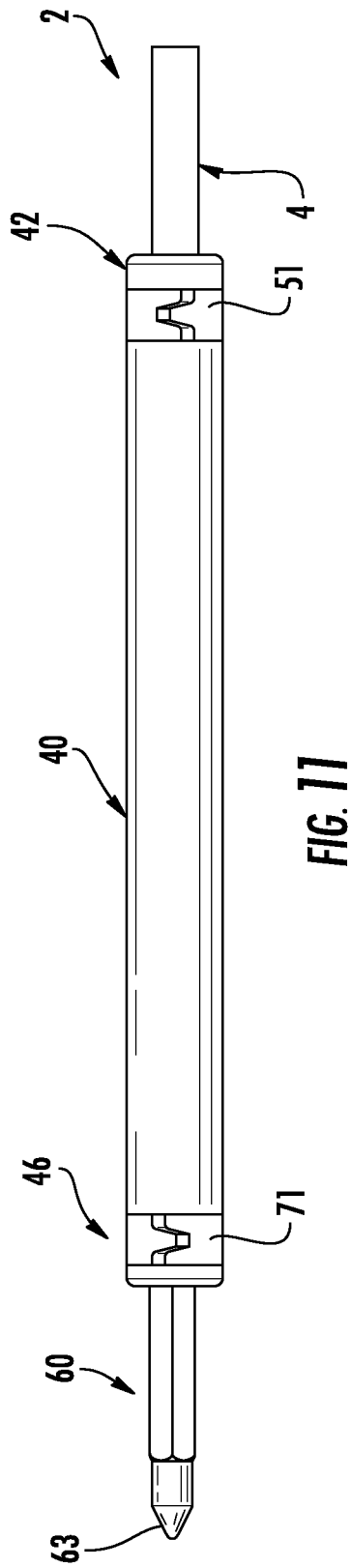
FIG. 11 is a plan view of another embodiment of the drill bit and drilling system of the invention assembled.

One embodiment of a bit and drilling system is shown in FIGS. 1 through 6. In some embodiments the bit 2 comprises a quick change shank 4 suitable for use with a quick change chuck. While the quick change chuck may be any size, in one embodiment the quick change shank 4 is a ¼ inch shank that may be used with existing ¼ inch quick change chucks. The quick change shank 4 may comprise a plurality of flat faces 6 disposed about the shank 4 and extending along the longitudinal axis of the bit 2. An annular groove 8 is formed in the periphery of the shank 4 for receiving a locking member of the quick change chuck. The ¼ inch quick change shank 4 may also be used in a standard chuck of a typical power drill. The ¼ inch quick change shank may also be used in power tool extensions. While in some embodiments a quick connect shank may be used, in other embodiments a round shank may be used as illustrated in FIG. 11.

A cutting portion 10 of the bit is provided that is suitable for drilling into a suitable material where the geometry and material of the cutting portion may be designed for a particular material such as masonry, wood, metal or the like. As illustrated in FIGS. 1 through 6 the cutting portion 10 is designed for use with masonry, concrete, or other similar materials. In other embodiments the cutting portion may be designed to drill into wood, metal or other materials. The cutting portion may comprise a variety of flutes 12, cutting edges 14 and cutting tips 16. The cutting portion 10 and shank 4 may be made of a single piece of material or they may be made of different components secured together to form the bit. For example, the cutting portion 10, or selected areas of the cutting portion 10, such as the cutting edges, may be made of different materials, such as harder materials, than the shank 4 or other areas of the cutting portion 10.

Figure 12:
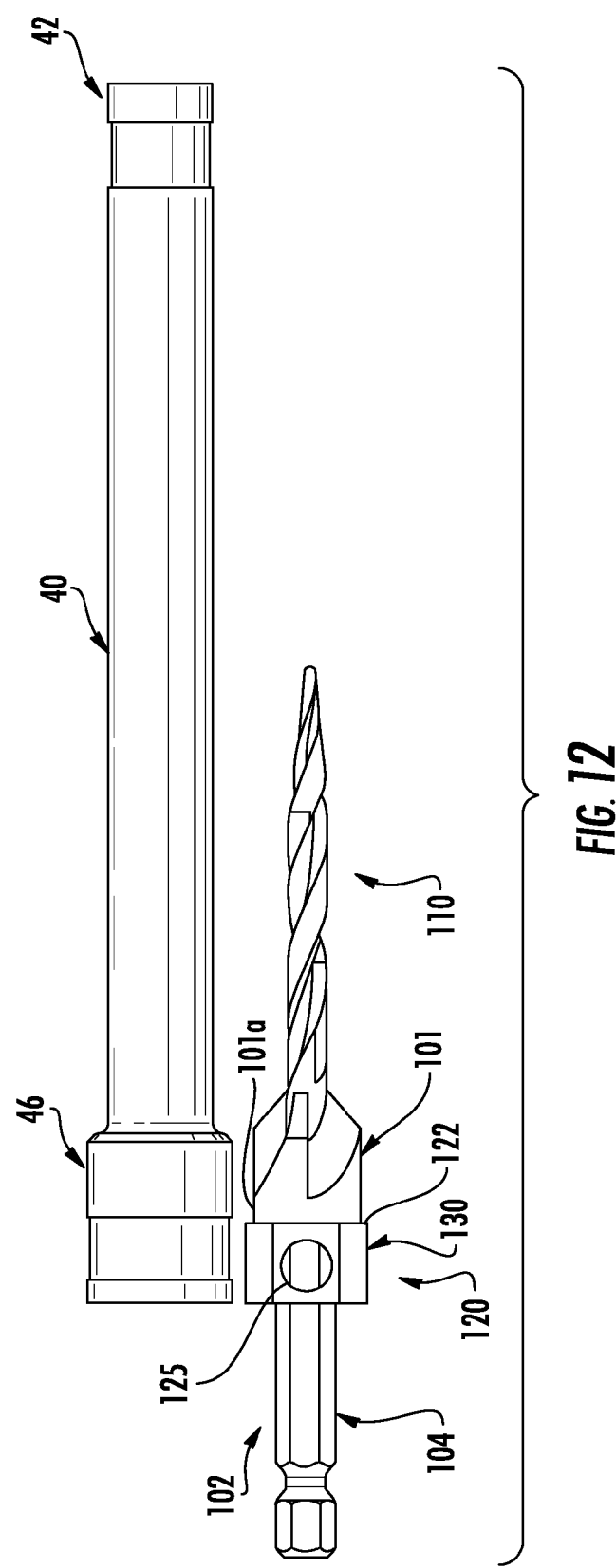
FIG. 12 is a plan view of yet another embodiment of the drill bit and drilling system of the invention disassembled.
Figure 13:
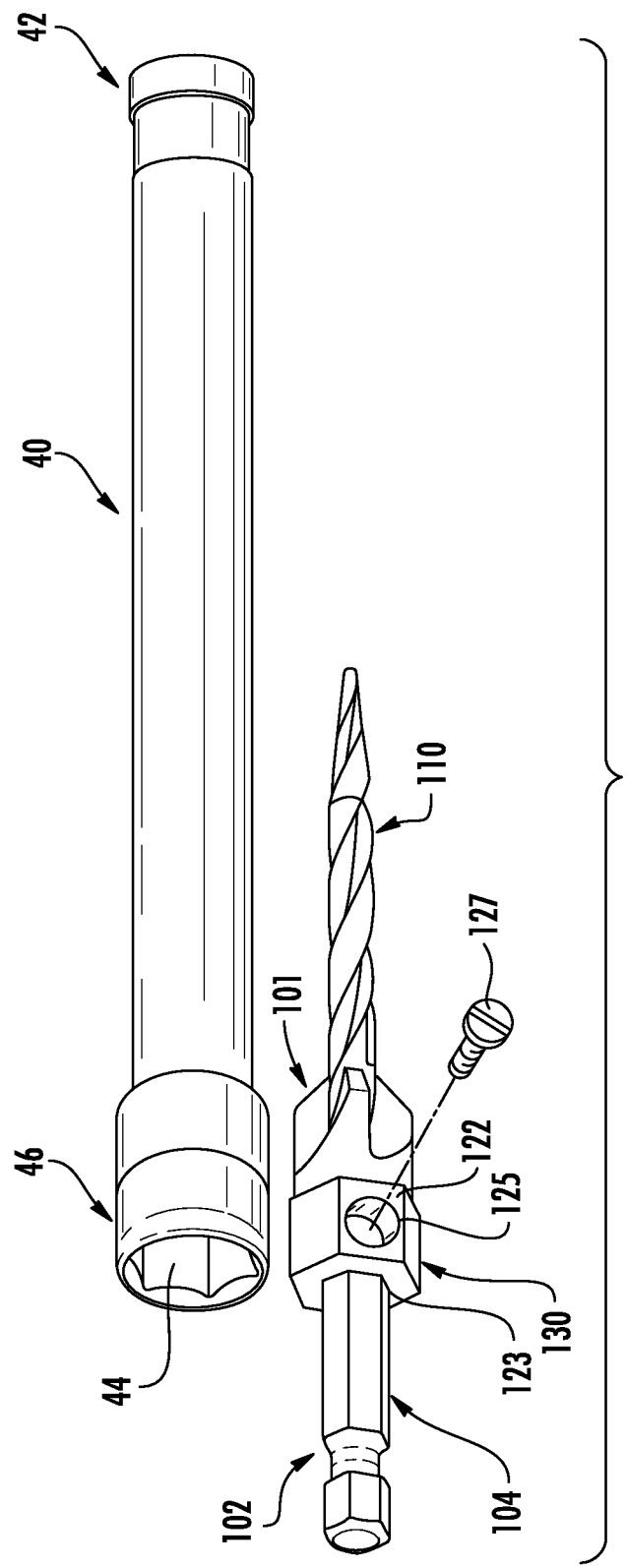
FIG. 13 is a perspective view of the embodiment of FIG. 12 disassembled.

Positioned between the shank and the cutting portion is a collar 20. The collar 20 may be positioned along the length of the bit 2 at a desired depth distance of the hole being drilled. In one embodiment, the collar 20 comprises a shoulder or stop 22 having a major lateral dimension that is larger than the diameter of the hole being drilled such that the stop 20 may abut the surface 24 of the article being drilled to limit the distance the drill bit 2 may be inserted into the material as shown in FIG. 14a. In use the drill bit 2 penetrates into the material being drilled until the stop 22 of the collar 20 abuts the surface 24 to control the depth of the hole to the desired depth distance. The depth distance may be predetermined such that the collar 20 is permanently fixed in position along the length of the bit 2 at a position that provides the desired depth distance. The collar 20 may be formed as a single piece with the shank 4 and the cutting portion 10. For example, the cutting portion 10, shank 4 and collar 20 may be milled or otherwise made from a one-piece stock component. Alternatively, the collar 20 may comprise a separate component permanently secured to the bit to form a unitary member. For example, the collar 20 may be welded, brazed or otherwise permanently secured to the bit. With a fixed collar 20 different sized bits may be made and sold having different diameters, lengths and depth distances. In certain applications standard size fasteners are known that are intended to be used in pilot holes having a predetermined size and depth. In some embodiments the bit may be configured to be used with the standard fasteners. While in one embodiment the collar 20 is fixed in position along the length of the bit at a predetermined depth distance, in other embodiments the collar 20 may be fixed to the bit at any position along the length of the bit if the collar is not used to control the depth distance. In some embodiments the collar may be made adjustable along the length of the bit and the collar may comprise a central bore that slidably receives the bit and may be temporarily fixed in position using a set screw or other releasable connector as shown in FIGS. 12 and 13.

In some embodiments, the collar 20 is formed with an engagement structure 30 that allows the collar 20 to be secured to a driver sleeve 40 such that the driver sleeve 40 and drill bit 2 rotate together. In one embodiment, the engagement structure 30 comprises the peripheral surface of the collar 20 formed with a plurality of faces 32 that create a shaped peripheral surface that may form a keyed connection with a mating engagement structure on the sleeve 40. For example, the peripheral surface may be formed with flat faces that form the hexagon profile as shown in the figures. The peripheral surface may have other keyed profiles including square, opposed flat and opposed curved surfaces, octagonal, pentagonal or other profiles.

The driver sleeve 40 has a mating engagement structure 42 formed adjacent one end thereof that may comprise a receptacle or socket 44 dimensioned and shaped to receive and mate with the engagement structure 30 of the bit 2 such that the bit 2 and sleeve are constrained to rotate together. The bit 2 is removably received in the socket 44 where the engagement structure 42 of the sleeve 40 engages the engagement structure 30 of the bit 2 to fix the bit to the sleeve. Where the engagement structure 30 on the bit comprises a keyed peripheral surface as described above, the engagement structure 40 on the sleeve may comprise a mating faceted socket. The sleeve 40 may be easily connected to and disconnected from the bit 2 by inserting the bit into and withdrawing the bit from the sleeve 40 in a linear direction to engage and disengage the mating engagement structures. The stop 22 on the bit may engage a surface of the socket 44 to position the bit in the sleeve 40. A locking mechanism 45 may be provided to temporarily fix the bit 2 to the sleeve 40. In one embodiment the locking mechanism 45 comprises a ball 47 that is biased into engagement with an annular groove 49 formed on the collar 20 such that a quick release coupling is created. The ball 47 may be biased to the locked position by a spring 51. The bit 2 may be inserted into the socket 44 to move the ball 47 against the bias of spring 51. When the bit 2 is fully inserted, the spring 51 moves the ball 47 into engagement with groove 49 to temporarily lock the bit 2 to the sleeve 40. The bit 2 may be removed from the sleeve 40 by pulling the bit 2 from the sleeve 40 to overcome the bias force of the spring 51 and release the ball 47 from groove 49. While a specific mating engagement structure has been described to removably retain the sleeve 40 on the drill bit 2 other keyed connections or couplers may also be used. For example, the socket may be formed on the collar 20 and the sleeve 40 may comprise a mating male member that may be inserted into the socket. In other embodiments other releasable mating engagement structures may be used between the sleeve 40 and the collar 20.

While in one embodiment the collar 20 and engagement structure 30 are formed with the stop 22 such that the stop and collar comprise a single member on the bit, the collar 20 and engagement structure 30 may be spaced from the stop 22 along the length of the bit 2. For example, the collar 20 and engagement structure 30 may be physically spaced from the stop 22 along the length of the bit 2 where the stop is formed as a separate flange or shoulder extending from the shank of the bit. The collar 20 and the engagement structure 30 may be formed integrally with the bit, such as part of a single member, such that both components are permanently fixed in position on the bit. In some embodiments the collar and engagement structure 30 may be permanently fixed in position on the bit 2 and the separate stop 22 may be movably adjustable along the length of the bit 2. In such embodiments the stop 22 may be arranged to pass through the mating engagement structure 42 on the sleeve 40 such that the engagement structure 30 on the collar 20 may engage the engagement structure 42 on the driver sleeve 40.

The driver sleeve 40 comprises a substantially hollow tubular member having the engagement structure 42 located proximate to one end thereof and a coupling mechanism 46 located at the opposite end thereof. While the sleeve 40 is shown as a substantially cylindrical member the sleeve may have other shapes. The sleeve 40 is dimensioned such that the sleeve 40 may fit over the cutting portion 10 of drill bit 2 with the drill bit 2 extending through the internal chamber 48 of the sleeve 40. The sleeve 40 has a length where when the engagement member 42 on the first end of the sleeve 40 is attached to the engagement structure 30 on the bit 2, the opposite end of the sleeve extends past the end of the bit 2 such that the end of the bit does not interfere with the ability of the coupling mechanism 46 to engage a fastener driver 60. When the sleeve 40 is installed on the bit, the cutting portion 10 of the bit is located in the chamber 48 of sleeve 40 between the engagement structure 42 and the coupler 46.

In one embodiment the coupling mechanism 46 comprises a receptacle or socket 55 dimensioned and shaped to receive and mate with the engagement structure 62 of the fastener driver 60 such that the fastener driver 60 and sleeve are constrained to rotate together. In this embodiment the fastener driver is shown as a screw driver. The fastener driver 60 is removably received in the socket 55 to fix the fastener driver 60 to the sleeve 40. Where the engagement structure 62 on the fastener driver 60 comprises a keyed quick connect shank as described above, the coupling mechanism 46 on the sleeve may comprise a mating faceted socket 55. The sleeve 40 may be easily connected to and disconnected from the fastener driver 60 by inserting the fastener driver 60 into and withdrawing the fastener driver 60 from the sleeve 40 in a linear direction. A locking mechanism 65 may be provided to temporarily fix the fastener driver 60 to the sleeve 40. In one embodiment the locking mechanism 65 comprises a ball 67 that is biased into engagement with an annular groove 69 formed on the fastener driver 60 such that a quick release coupling is created. The ball 67 may be biased to the locked position by a spring 71. The fastener driver 60 may be inserted into the socket 55 to move the ball 67 against the bias of spring 71. When the fastener driver 60 is fully inserted, the spring 71 moves the ball 67 into engagement with groove 69 to temporarily lock the fastener driver 60 to the sleeve 40. The fastener driver 60 may be removed from the sleeve 40 by pulling the fastener driver 60 from the sleeve 40 to overcome the bias force of the spring 71 and release the ball 67 from groove 69. While a specific mating structure has been described to removably retain the fastener driver 60 in sleeve 40 other keyed connections or couplers may also be used.

Referring to FIGS. 7-10, in one embodiment the coupling mechanism 46 comprises a male head such as a square head 50 that is releasably engageable with a mating socket 52 formed on the fastener driver 60. In this embodiment the fastener driver 60 is shown as a socket. In still other embodiments the coupling mechanism 46 may comprise a quick connect coupler, chuck or other coupling device. In still other embodiments the fastener driver 60 may be made integrally with the sleeve 40 such that the fastener driver is not removable from the sleeve. The fastener driver 60 comprises an interface 63 at the distal end thereof suitable for engaging the screw or other fastener 80 that is to be screwed into the pilot hole. The interface 63 may comprise standard sockets, screwdriver heads, Torx heads, Phillips heads or any suitable drive interface.

As shown in the drawings the drill bit 2 may be inserted into the sleeve 40 through an aperture formed in the engagement structure 42 such that the drill bit extends into the chamber 48 along the longitudinal axis of the sleeve. The bit 2 is inserted into the sleeve 40 until the engagement structure 42 on the sleeve 40 matingly engages the engagement structure 30 on the bit 2. In one embodiment, the engagement structure 42 comprises a socket 44 on the sleeve 40 that receives the keyed collar 30 such that the sleeve 40 is constrained to rotate with the bit 2. The socket 44 defines an open end or aperture 39 such that the bit may be inserted through the socket until engagement structure 30 engages engagement structure 42. The sleeve 40 may be removed from the bit 2 simply by pulling the sleeve away from the bit to disengage the engagement structure 30 on the bit from the mating engagement structure 42 on the sleeve 40. When the sleeve 40 is mounted on the bit 2, the bit 2 extends through the sleeve but stops short of the coupling mechanism 46 such that the bit 2 does not interfere with the operation of the coupling mechanism 46. A suitable fastener driver 60 may be connected to the sleeve 40 at the coupling mechanism 46 such that rotation of the bit 2 is transferred to the sleeve 40 and, through the sleeve 40, to the fastener driver 60. The fastener driver 60 may then be used to rotate a fastener such as a threaded screw.

The method of operation of the system of the invention to insert a fastener 80, such as a screw, in a material will now be described with reference to FIGS. 14A-14C. The shank 4 of the bit 2 is inserted into the chuck 90 of a suitable power tool 92 such as a power driver, power drill or the like. A hole 82 is drilled using the cutting portion 10 of the rotary bit 2 (FIG. 14A). The depth of the hole may be controlled by the position of the stop 22 along the longitudinal axis of the bit 2. The stop 22 may be formed as part of the collar 20 or it may comprise a separate component or portion of the bit. If a stop 22 is used to control the depth distance, when the stop 22 contacts the surface 24 of the article being drilled a pilot hole 82 of the desired depth is formed. The drill bit 2 may then be removed from the pilot hole. The sleeve 40 is mounted on the bit without removing the bit 2 from the chuck 90 of the power tool 92 (FIG. 14B). To mount the sleeve 40 to the bit 2, the bit 2 is inserted into the first end of the sleeve 40 through the engagement structure 42 until the engagement structure 42 of the sleeve 40 is engaged with the mating engagement structure 30 on the bit 2. A suitable fastener driver 60 may be attached to the coupling mechanism 46 at the free end of the sleeve 40, the fastener driver 60 being selected to mate with the fastener 80 being used. The fastener driver 60 may be rotated by rotating the rotary power tool to rotate the bit 2. The rotation of the bit 2 is transferred to the sleeve 40 by the engagement of the engagement structure 42 on the sleeve with 40 the engagement structure 30 on the collar 20 and to the fastener 80 to drive the fastener 80 into hole 82 (FIG. 14C). The sleeve 40 may be easily removed from the bit 2 by pulling the sleeve 40 away from the bit to disengage the engagement structure 42 on the sleeve with 40 the engagement structure 30 on the bit 2. Removal of the sleeve exposes the drill bit 2 such that the drill bit may be used to drill another hole. This process may be repeated such that the pilot hole may be drilled and the fastener inserted into the pilot hole simply by installing the sleeve on and removing the sleeve from the bit. The bit with the collar remains mounted in the chuck of the rotary power tool for both operations.

While embodiments of the drill bit and installation system of the invention has been described with respect to a masonry bit, the system may be used with other materials and other types of cutting portions such as wood bits, metal bits or other types of bits. An embodiment of a wood bit 102 is shown in FIGS. 12 and 13 having a shank 104 as previously described but with the cutting portion 110 adapted for cutting wood. The collar 120 comprises an engagement structure 130 similar to the faceted peripheral face as previously described. A countersink cutting head 101 suitable for drilling a countersink hole is also provided. The countersink cutting head 101 may be mounted on the bit 102 and/or attached to or formed integrally with the collar 120 such that a countersink hole is formed at the end of the pilot hole being drilled by cutting portion 110. The collar 120 may comprise a shoulder or stop 122 that extends beyond the countersink head 101 such that the stop 122 contacts the surface of the article being drilled to stop penetration of the bit into the article when the end 101a of the countersink head 101 is flush with the surface. The collar 120 may comprise a peripheral surface that forms the engagement structure 130 for engaging a mating socket 42 formed on the sleeve 40 as previously described. The collar 120, engagement structure 130 and the countersink head 101 may be made movable along the length of the bit to adjust the distance the collar is positioned from the end of the cutting portion to control the depth distance. The collar 120 may comprise a longitudinally extending hole 123 that receives the bit 102 and that is intersected by a threaded hole 125 that receives a set screw 127 that engages the bit 102 to fix the collar 120 in position relative to the bit. In some embodiments, collar 120 and the countersink head 101 may be made movable along the length of the bit to adjust the distance the collar is positioned from the end of the cutting portion to control the depth distance. In other embodiments the collar 120 and the countersink head 101 may be permanently secured to the bit in a fixed position along the length of the bit.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:
1. A drilling apparatus comprising:
   a drill bit comprising:
      a shank adapted to be attached to a power tool;
      a cutting portion adapted to drill a hole in a material; and
      a collar spaced along the length of the drill bit; and
      a first engagement structure;
   a sleeve comprising:
      a first end and a distal second end;
      a second engagement structure disposed adjacent the first end and releasably engageable with the first engagement structure of the drill bit; and
      a coupling mechanism disposed adjacent the send end, the coupling mechanism releasably coupling a fastener driver to the sleeve.

2. The drilling apparatus of claim 1, wherein the first engagement structure is formed on the collar of the drill bit.

3. The drilling apparatus of claim 1, wherein the first engagement structure comprises a peripheral surface of the collar formed with at least one flat face.

4. The drilling apparatus of claim 1, wherein the second engagement structure comprises a socket opening configured to slidably receive and engage the first engagement structure of the drill bit.

5. The drilling apparatus of claim 1, wherein the sleeve comprises a hollow chamber disposed between the second engagement structure and the coupling mechanism and dimensioned to receive the cutting portion of the drill bit therein.

6. The drilling apparatus of claim 1, wherein the coupling mechanism comprises one of a socket and a head.

7. The drilling apparatus of claim 1, wherein the cutting portion of the drill bit is insertable through the second engagement member into the sleeve.

8. The drilling apparatus of claim 1, wherein the sleeve comprises an internal chamber where the internal chamber is accessible through an aperture such that the drill bit is inserted through the aperture into the chamber with the first engagement structure engaging the second engagement structure.

9. The drilling apparatus of claim 1, wherein the cutting portion of the drill bit has a maximum cutting diameter, wherein the collar is fixed in position on the drill bit, and wherein the collar has a first diameter that is greater than the maximum cutting diameter of the cutting portion of the drill bit to set a depth distance that determines a distance the drill bit penetrates into a material being drilled.

10. The drilling apparatus of claim 1, wherein the cutting portion of the drill bit has a maximum cutting diameter, and wherein the collar has a first diameter that is greater than the maximum cutting diameter of the cutting portion of the drill bit to set a depth distance that determines a distance the drill bit penetrates into a material being drilled, and wherein the collar is movable along the length of the drill bit to vary the depth distance.

11. The drilling apparatus of claim 1, wherein the collar comprises a countersink head.

12. A method of installing a fastener comprising:
    attaching a drill bit to a power tool, the drill bit comprising:
        a shank;
        a cutting portion adapted to drill a hole in a material;
        a collar permanently secured to the drill bit in a position along the length of the drill bit; and
        a stop provided along the length of the drill bit, wherein the stop sets a depth distance that the drill bit is allowed to be inserted into a material being drilled;
    drilling a hole using the cutting portion to penetrate the material;
    removing the drill bit from the hole;
    securing a first end of a driver sleeve to the drill bit, the driver sleeve supporting a fastener driver at a distal second end of the driver sleeve; and
    screwing a fastener into the hole using the fastener driver.

13. The method of claim 12, wherein the driver sleeve further comprises an opening at the second end and a coupling mechanism disposed adjacent the second end, the method further comprising:
    inserting at least a portion of the fastener driver into the opening of the second end of the driver sleeve; and
    attaching the fastener driver to the driver sleeve using the coupling mechanism.

14. The method of claim 12, wherein the step of securing the first end of the driver sleeve to the drill bit comprises inserting at least a portion of the drill bit into a first opening at the first end of the driver sleeve.

15. The method of claim 12, wherein the driver sleeve further comprises a mating second engagement structure disposed within the driver sleeve and wherein the step of securing the first end of the driver sleeve to the drill bit comprises engaging a first engagement structure on the drill bit with the mating second engagement structure in the driver sleeve.

16. A drill bit comprising:
    a first end and a distal second end;
    a shank extending from the first end toward the second end, the shank comprising a quick change shank configured to attach the shank to a power tool;
    a cutting portion extending from the second end towards the first end and adapted to drill a hole in a material; and
    a collar spaced along the length of the drill bit between the quick connect mechanism and the cutting portion, the collar comprising a first engagement structure adapted to be attached to a sleeve.

17. The drilling apparatus of claim 16, wherein the first engagement structure comprises a peripheral surface of the collar formed with at least one flat face.

18. The drilling apparatus of claim 16, wherein the collar is fixed in position on the drill bit to set a depth distance that determines a distance the cutting portion of the drill bit penetrates into a material being drilled.

19. A method of installing a fastener comprising:
    attaching a drill bit to a power tool, the drill bit comprising:
        a shank;
        a cutting portion adapted to drill a hole in a material; and
        a collar permanently secured to the drill bit in a position along the length of the drill bit;
    drilling a hole using the cutting portion to penetrate the material;
    removing the drill bit from the hole;
    securing a first end of a driver sleeve to the drill bit, the driver sleeve comprising an opening at a distal second end of the driver sleeve and a coupling mechanism disposed adjacent the second end, the driver sleeve supporting a fastener driver at the second end of the driver sleeve;
    inserting at least a portion of the fastener driver into the opening of the second end of the driver sleeve;
    attaching the fastener driver to the driver sleeve using the coupling mechanism; and
    screwing a fastener into the hole using the fastener driver.

* * * * *